United States Patent [19]

Lucas

[11] 4,456,225
[45] Jun. 26, 1984

[54] CABLE PULLING APPARATUS

[76] Inventor: Floyd Lucas, 6511 Culmore, Houston, Tex. 77017

[21] Appl. No.: 453,280

[22] Filed: Dec. 27, 1982

Related U.S. Application Data

[63] Continuation-in-part of Ser. No. 313,768, Oct. 22, 1981, abandoned.

[51] Int. Cl.³ .............................................. E21C 29/16
[52] U.S. Cl. ..................... 254/134.3 FT; 254/134.3 R
[58] Field of Search ............... 254/134.3 R, 134.3 FT, 254/134.3 PA, 311, 312, 294, 295, 281, 284, 285; 248/354 L, 354 P, 354 R; 242/157 R; 212/188

[56] References Cited

U.S. PATENT DOCUMENTS

| | | | |
|---|---|---|---|
| 1,890,423 | 12/1932 | Teagarden | 248/354 P |
| 2,286,781 | 6/1942 | Abramson et al. | 254/134.3 FT |
| 3,072,382 | 1/1963 | Jones | 254/134.3 R |
| 3,190,616 | 6/1965 | Oleson | 254/134.3 FT |
| 3,201,090 | 8/1965 | Jones | 254/134.3 FT |
| 3,223,384 | 12/1965 | Gebo | 254/134.3 FT |
| 3,244,292 | 4/1966 | Elliott | 254/134.3 FT |
| 3,811,656 | 5/1974 | Hoover | 254/311 |
| 3,968,952 | 7/1976 | Newell | 254/134.3 R |
| 3,971,544 | 7/1976 | Smith | 254/134.3 FT |
| 4,337,924 | 7/1982 | Gebo | 254/134.3 R |

Primary Examiner—Robert C. Watson
Attorney, Agent, or Firm—Neal J. Mosely

[57] ABSTRACT

A cable pulling apparatus is disclosed for use in residential, commercial, and industrial construction. The apparatus provides for pulling electrical cables and the like through conduits by first attaching a rope or cord to the cable for pulling by the apparatus. The cable pulling apparatus comprises a portable assembly having a motor which drives a plurality of capstans to provide variable amounts of available cable pulling force at different rates of pulling speed. The apparatus is adjustable in length and has an adjustable system of pulleys and supporting brackets operable to pull the cable by direct or straight pull or by pulling at an angle or around a corner. The system of pulleys and brackets is arranged so that angular pulling up to 180° can be accomplished without bending the cable sharply and also accomplishing pulling in more than one plane.

20 Claims, 21 Drawing Figures

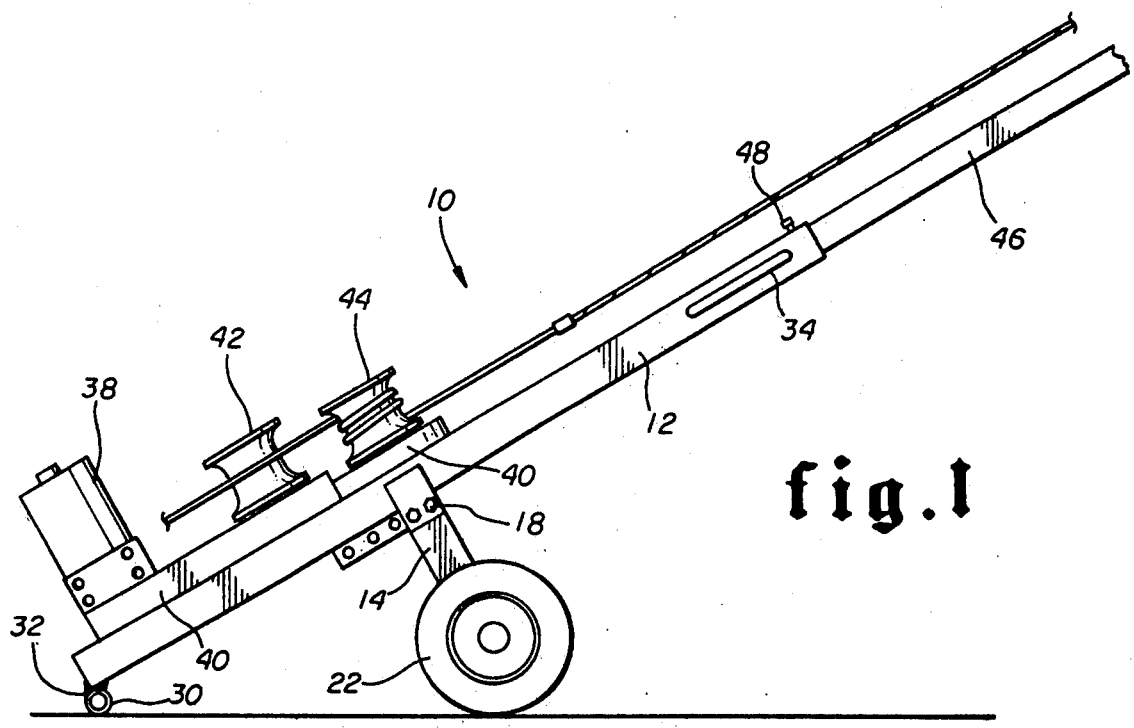
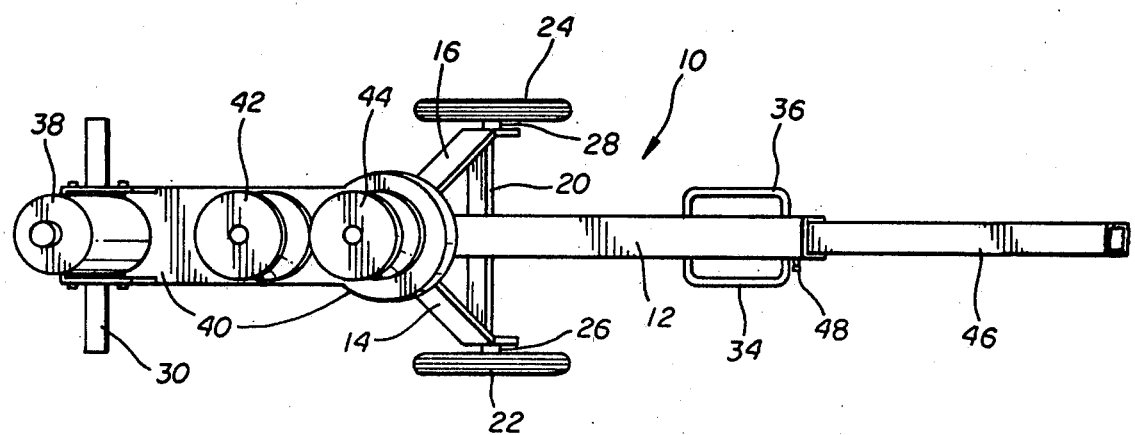
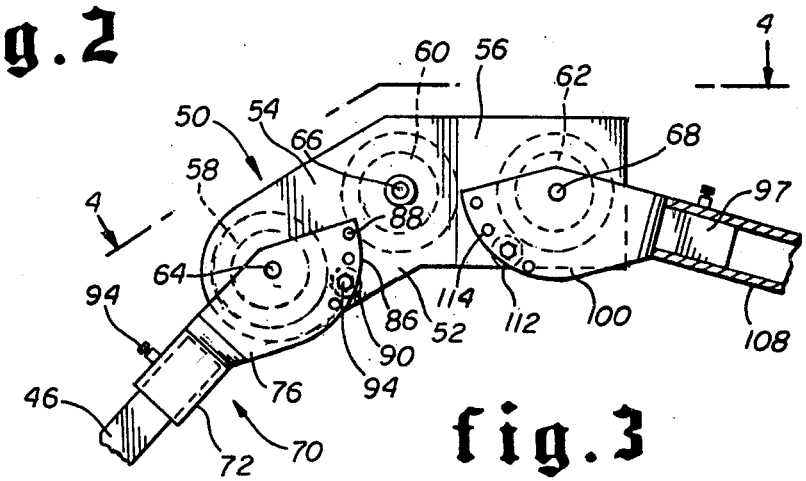

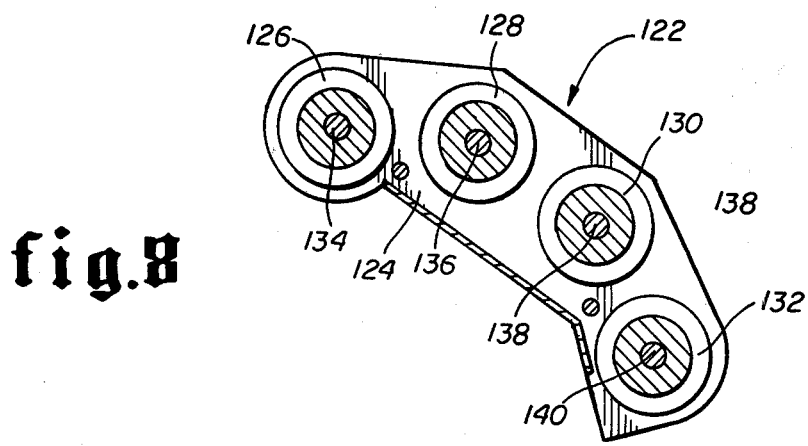
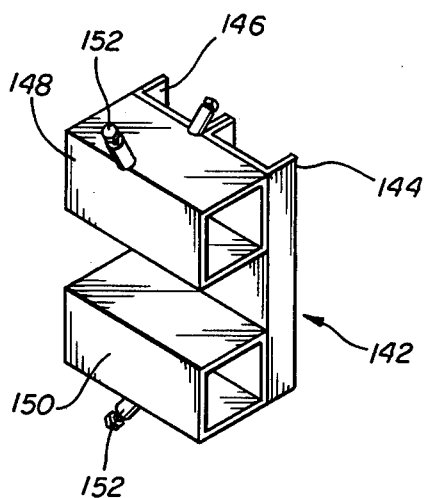
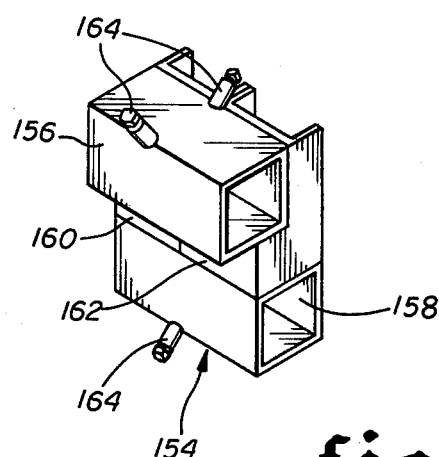
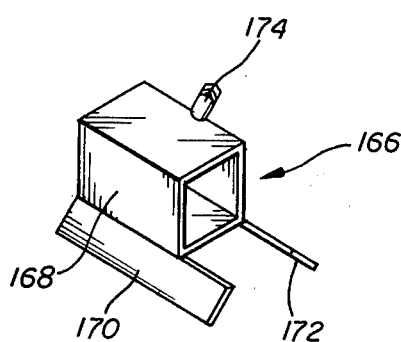
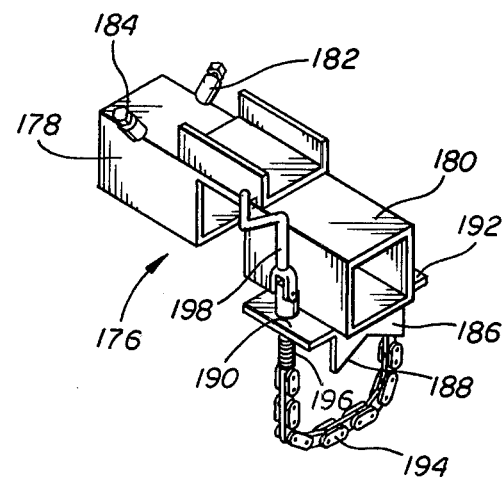

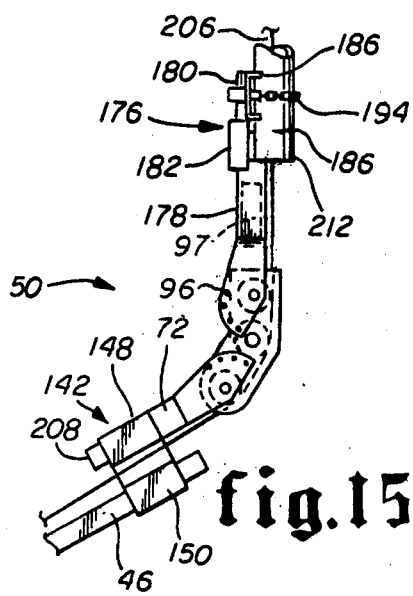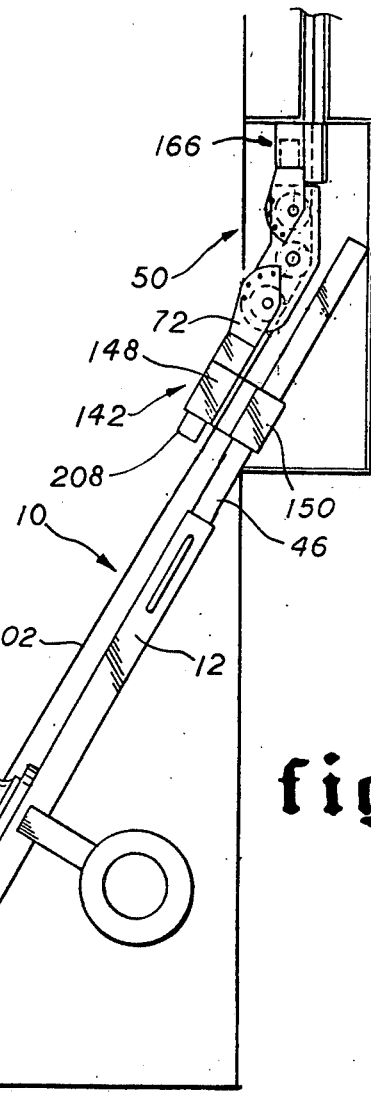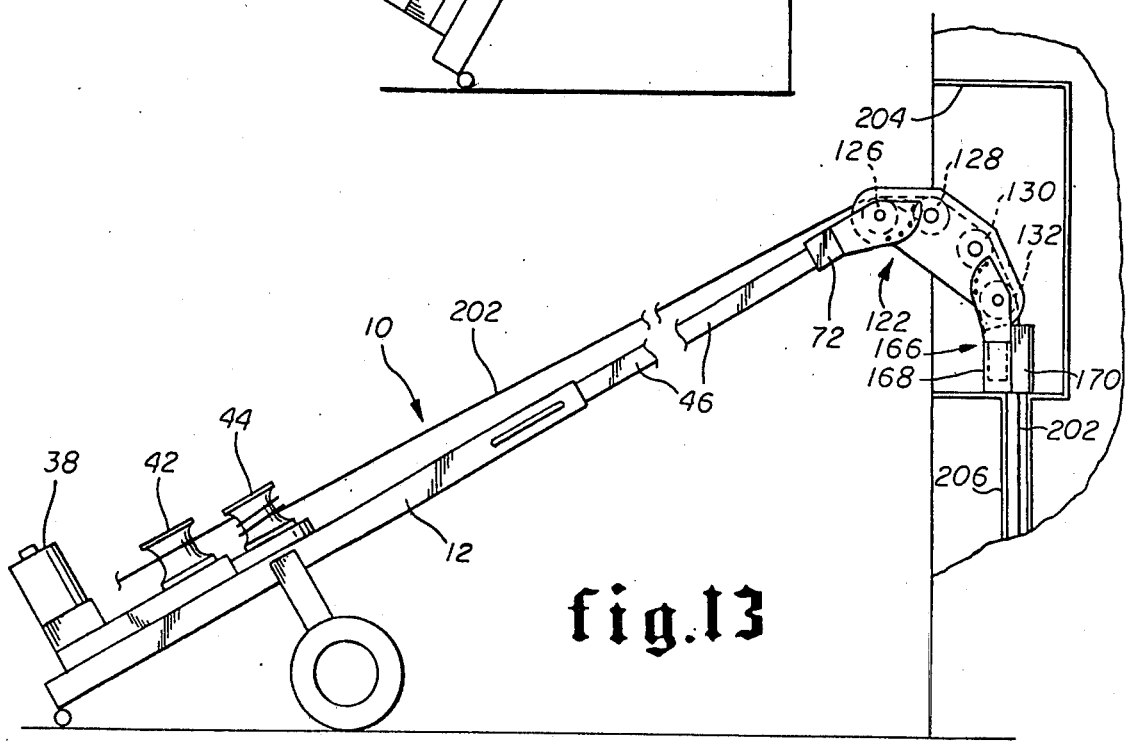

CABLE PULLING APPARATUS

CROSS REFERENCE TO RELATED APPLICATION

This application is a continuation-in-part of my copending application Ser. No. 313,768, filed Oct. 22, 1981 now abandoned.

BACKGROUND OF THE INVENTION

1. Field of the Invention

This invention relates to new and useful improvements in apparatus for pulling electrical cable through conduits in buildings.

2. Brief Description of the Prior Art

In the construction of residential, commercial, and/or industrial buildings, it is necessary to provide electrical service at many locations. This is accomplished by pulling electrical cable through conduits which may be in a variety of locations, e.g. underground, overhead, eye level, enclosed, etc. A common prodcedure is to provide a pull line or rope through each electrical conduit which is attached at one end to the electrica cable and at the other end to a powered pulley or the like to pull the cable through the conduit.

The design and layout of the electrical conduits is dictated by standard electrical design codes, ordinances, and the like. One design factor which is considered in conduit design is angular bends in the conduit. For any given electrical cable, there exists a maximum angle or minimum curvature radius that the cable can be bent in order to avoid permanent damage to the cable. Apparatus which has previously been available has been lacking in portability and in flexibility of operation.

One such apparatus, which is commercially available is the Greenlee "Porta Puller" for pulling cable. This equipment is quite bulky and difficult to carry which reduces its portability. Also, it had the disadvantage that it cannot pull cable around sharp bends, as where it is necessary to pull a cable upward, around a pulley and back down.

Gebo U.S. Pat. No. 4,337,924 discloses a powered cable pulling apparatus having extensible arms which support pulleys over which the cable is pulled. This apparatus has no provision for protecting the cable against damage when pulling through a 180° bend.

Newell U.S. Pat. No. 3,968,952 discloses a cable pulling apparatus which is portable and has a powered winch which pulls the cable over an adjustably positioned set of pulleys. This apparatus is inflexible in the number of different locations in which it can work and does not protect the cable when pulling through sharp bends.

Oleson U.S. Pat. No. 3,190,616 discloses another type of cable pulling apparatus which is portable, but which is quite limited in the number of different positions in which it can work.

Jones U.S. Pat. No. 3,072,382 shows a powered winch arrangement for pulling electrical cable. This apparatus is flexible in operation but does not have adequate portability or protection of the cable in pulling through sharp bends.

Gebo U.S. patent shows a system of pulleys for pulling electrical cable. This is not a portable, self contained apparatus.

Elliott U.S. patent shows a truck mounted power winch for general purpose load handling and cable pulling.

SUMMARY OF THE INVENTION

One of the objects of the invention is to provide a new and improved portable cable pulling apparatus.

Another object of the invention is to provide a cable pulling apparatus capable of pulling an electrical cable from a vertical downhole location, or in any angular manner.

A further object of the invention is to provide a cable pulling apparatus with extensible arms for servicing remotely positioned conduits.

Still another object of the invention is to provide a cable pulling apparatus including a system of pulleys for pulling a cable through a series of small angular turns to go around a sharp turn without damage.

Still another object of the invention is to provide a cable pulling with a frictional capstan type drive or powered winch.

Yet another object of the invention is to provide a cable pulling aparatus which is flexible in operation and capable of utilization in a variety of locations.

Yet another object of the invention is to provide a cable pulling apparatus which is inexpensive to manufacture and easy to operate.

Other objects of this invention will become apparent from time to time throughout the specification and claims as hereinafter related.

These and other objects of the invention are accomplished by a novel cable pulling apparatus for use in residential, commercial, and industrial construction. The apparatus provides for pulling electrical cables and the like through conduits by first attaching a rope or cord to the cable for pulling by the apparatus.

The cable pulling apparatus comprises a portable assembly having a motor which drives a plurality of capstans to provide variable amounts of available cable pulling force at different rates of pulling speed. The apparatus is adjustable in length and has an adjustable system of pulleys operable to pull the cable by direct or straight pull or by pulling at an angle or around a corner. The system of pulleys is arranged so that angular pulling up to 140° (or up to 180° with modification) can be accomplished without bending the cable sharply.

BRIEF DESCRIPTION OF THE DRAWINGS

FIG. 1 is a view in side elevation of a cable pulling apparatus representing a preferred embodiment of this invention.

FIG. 2 is a plan view of the apparatus of FIG. 1.

FIG. 3 is a view in side elevation of a pulley assembly having three pulleys for use in the apparatus of FIG. 1 for directing the cable around a substantial angle.

FIG. 8 is a view in longitudinal central section of the pulley assembly shown in FIG. 6.

3

FIG. 9 is an isometric view of an offset bracket for supporting portions of the apparatus in offset parallel relation.

FIG. 10 is an isometric view of an offset bracket for supporting portions of the apparatus in offset displaced or skewed parallel relation.

Figure 6:
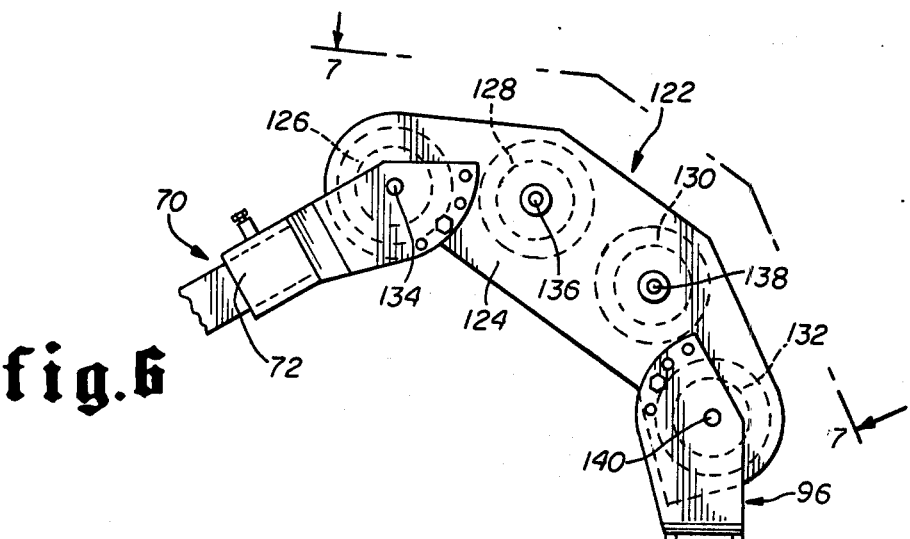
FIG. 6 is a view in side elevation of a pulley assembly having four pulleys for use in the apparatus of FIG. 1 for directing the cable around a substantial angle.

FIG. 11 is an isometric view of a bracket for the end connectors of the pulley assemblies of FIGS. 3 and 6 and having dihedral supporting plates.

FIG. 12 is an isometric view of a bracket for supporting the end of a tubular extension or other male member of the apparatus and having a releasable chain clamp for securing the same in a fixed position.

FIG. 13 is a view in side elevation illustrating the use of the apparatus in pulling cable vertically upward into a junction box.

FIG. 14 is a view in side elevation illustrating the use of the apparatus in pulling cable vertically downward into a junction box.

FIG. 15 is a detail view of the end portion of the apparatus for pulling cable horizontally in which the end portion is secured to the end of a horizontally extending electrical conduit.

Figure 16:
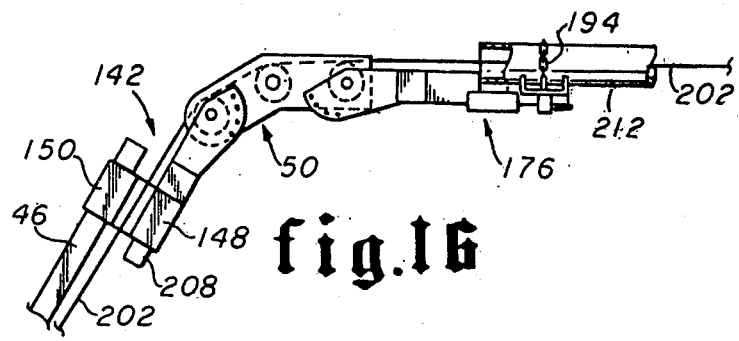

FIG. 16 is a side view of the apparatus of FIG. 1 positioned for pulling a cable outward through a horizontally extending conduit.

Figure 17:
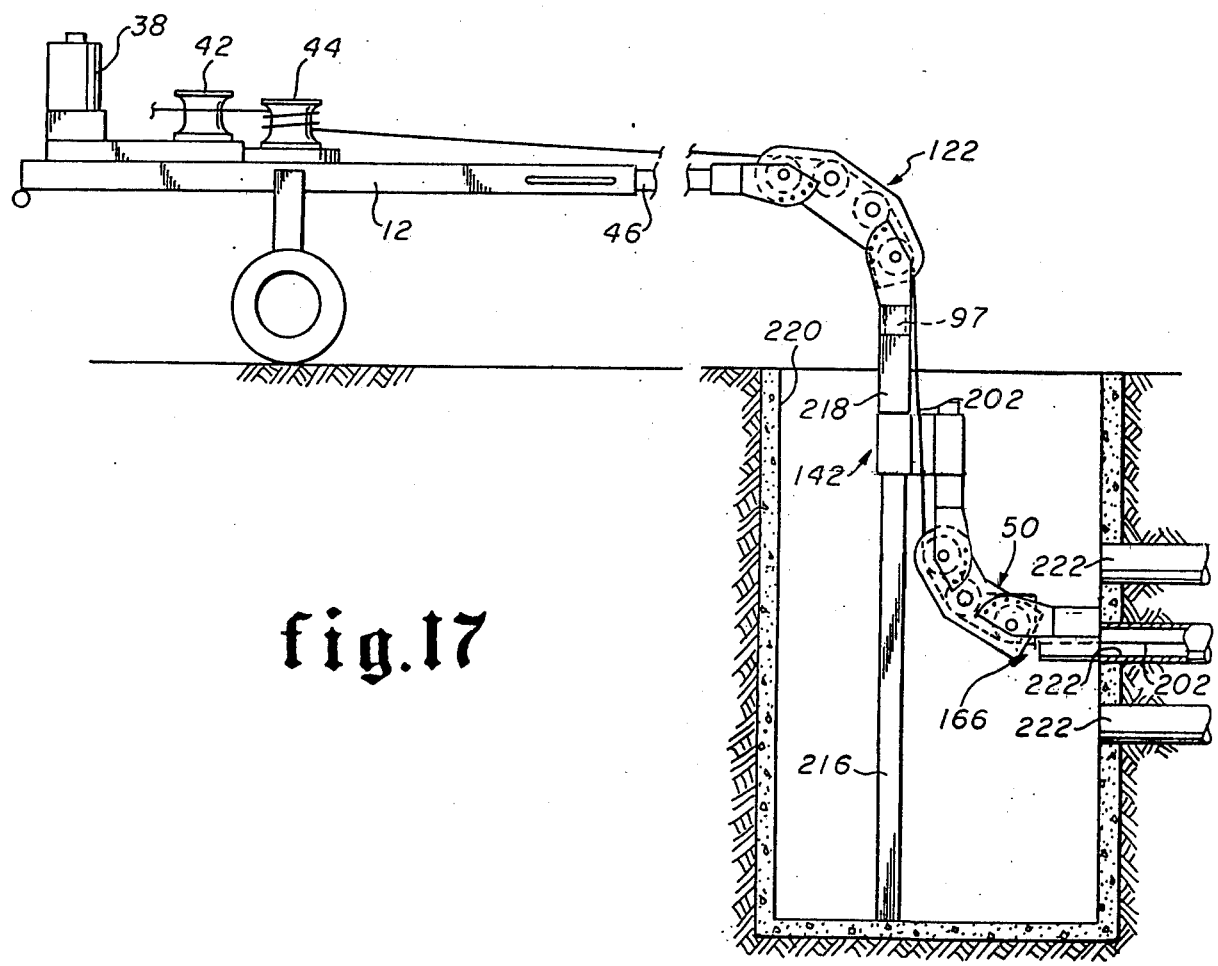

FIG. 17 is a side view of the apparatus of FIG. 1 positioned to pull cable from an underground conduit.

Figure 18:
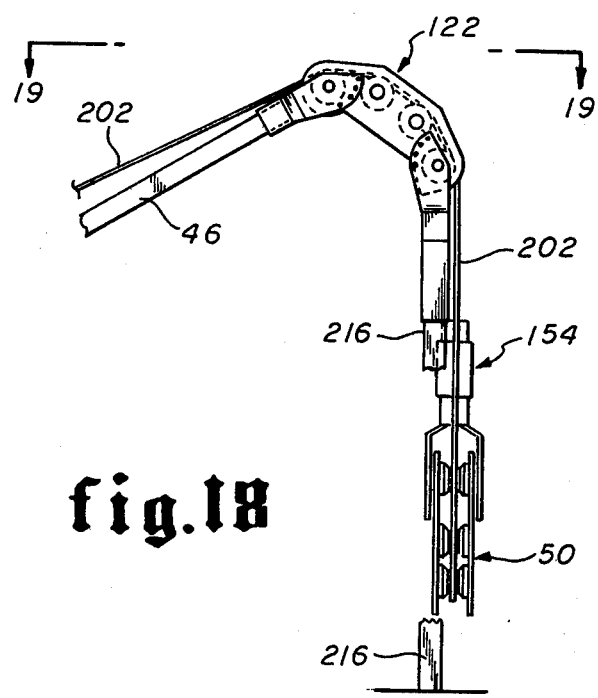

FIG. 18 is a detail side view of an extension arm of the cable pulling apparatus with a pair of pulley assemblies arranged for pulling a cable from the side and around an angle.

Figure 19:
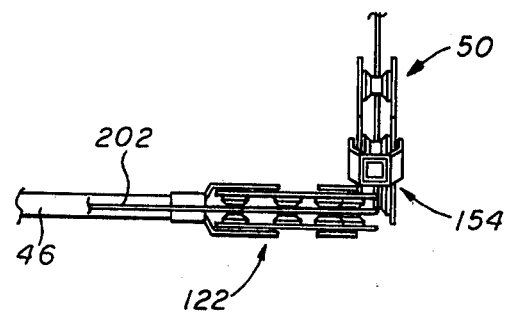

FIG. 19 is a top view from the line 19—19 of FIG. 18.

Figure 20:
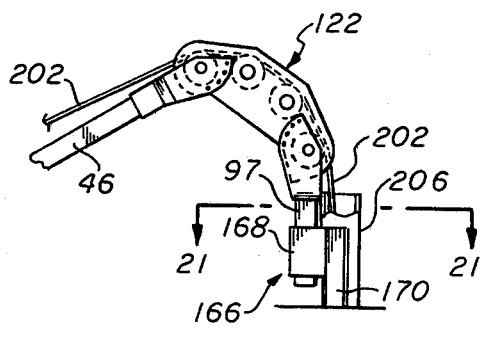

FIG. 20 is a detail side view of the end portion of the apparatus positioned against the projecting end of an electrical conduit for pulling cable therefrom.

Figure 21:
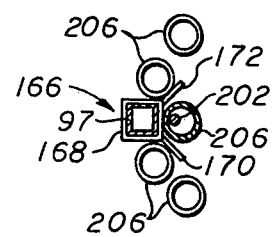

FIG. 21 is a sectional view on the line 21—21 of FIG. 20 showing the positioning of the end of the apparatus among several protruding conduits.

DESCRIPTION OF THE PREFERRED EMBODIMENTS

Referring to the drawings by numerals of reference, and more particularly to FIGS. 1 and 2, there is shown a mobile, powered cable pulling apparatus 10 for pulling electrical through conduits and buildings. The apparatus is primarily designed pulling cable through buildings which are under construction, although it could be used, if desired, for rethreading cable in existing buildings.

Cable pulling apparatus 10 is portable and versatile in operation and may be used in residential or commercial or other types of buildings. Cable pulling apparatus 10 consists of a supporting frame 12 comprising a elongated hollow tubing member of square cross section. Frame 12 is supported on a pair of axle brackets 14 and 16 which are secured by plurality of bolts 18. A brace 20 extends between axle brackets 14 and 16 to stiffen the brackets as a support for the wheels. A pair of wheels 22 and 24 are supported on axles 26 and 28 which extend into and are supported in the lower ends of axle 14 and 16. At one end of the frame 12, there is provided a handle bar 30 which is secured thereon by welding or brazing as indicated at 32. The handle bar 30 permits the apparatus to lifted or handled from that end. The opposite end of frame 12 provided with a pair of handles 34 and 36 welded or otherwise secured in place.

At the lower end of the apparatus, as seen in FIG. 1, there is provided a suitable motor 38 for driving the apparatus. The motor 38 is preferably an electric motor, although any suitable motor, including an internal combustion engine, pneumatic motor, hydraulic motor, or the like, can be used. Motor 38 is supported on a plate like supporting structure 40 which is secured on frame 12. A pair of powered pulleys or capstans 42 and 44 are supported on plate like support 40 on frame 12.

the capstans 42 and 44 are driven by a suitable gear train interconnecting the rotary motor shaft (not shown) of motor 38 and gears (not shown) at the lower ends of capstans 42 and 44. The drive gear train is one which reduces the speed of the motor shaft and drives pulley or capstan 42 and substantially higher speed than pulley or capstan 44. The difference in speed of rotation of these capstans is a result of the fact that capstan 42 is secured to a gear which is an intermediate gear in a gear speed reduction train. The motor 38 is operable to drive capstans 42 and 44 to pull a cable through the conduit in a building.

In pulling cable through a conduit, the cable is first tied to a pull cord or rope. The pull cord is threaded through the conduit and is wrapped around on of the pulleys or capstans. Motor 38 rotates the capstans to pull the cord or rope and draw the cable through the conduit until it is pulled completely out of the conduit for making the appropriate electrical connections at a junction box or fuse box or the like. When the cord or cable being drawn by the cord encounters only a slight amount of resistance, the cord or cable is wrapped around the capstan 42 which operates at low power and high speed. This caused the cable to drawn rapidly until a point is reached where there is more resistance to drawing the cable through the conduit. At that point, when substantial resistance is encountered, the cable is wrapped around pulley or capstan 44 which operates as substantially lower speed and higher power. This provides a more substantial force or pull to draw the pull cord and cable through the conduit.

The apparatus, as just described can be moved on the wheels 22 and 24 to any particular location where the motor 38 can be operated to turn pulleys or capstans 42 and 44 for use in drawing cable through the electrical conduits. The apparatus is provided with a number of auxiliary components which permit the use of the equipment in a variety of locations and at a variety of angles in relation to the outlet end of the conduit for which the cable is being pulled. The various components have the connecting portions thereof made of square tubing sized to provide male-female connections in assembly.

As previously noted, the frame 12 is made of hollow square tubing. A tubular extension 46 is provided which is of hollow square tubing having exterior dimensions which are slightly smaller than the interior dimensions of frame member 12. Tubular extension 46 is therefore supported in telescoping relation to frame member 12 and is secured at any desired position by a set screw 48 in FIGS. 1 and 2, the tubular extension 46 is broken to indicate an indefinite length to extension. Extension 46 may be of any suitable length and may be moved into and out of supporting frame member 12 to any selected amount of extension. The outer end of tubular extension 46 is square and fits into any of a number of auxiliary components used with the apparatus.

The square tubular connecting parts of the various auxiliary components which are male connectors have the same exterior dimensions as the tubular extension 46. There are also provided additional square tubular extensions having the same exterior dimensions as tubular extension 46 but which vary in size from very short connector pieces to pieces as long or longer than extension 46. The square tubular connecting parts which are female connectors have the same inner dimensions as the frame member 12.

Figure 4:
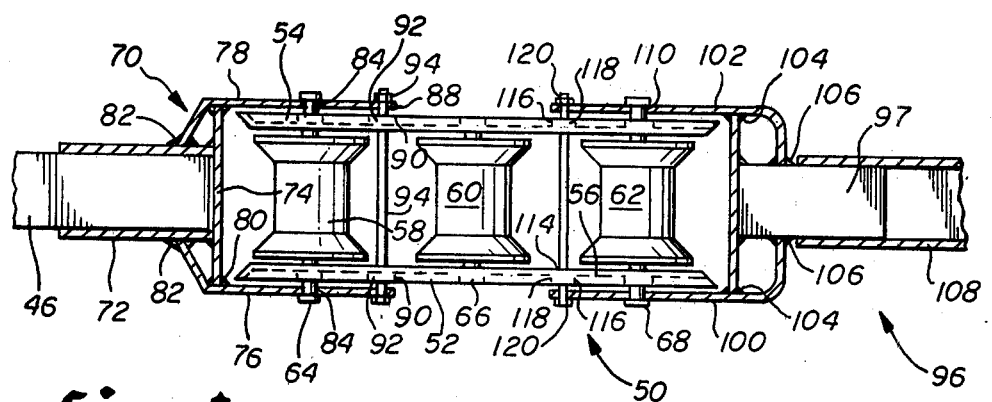
FIG. 4 is a top plan view of the pulley apparatus as viewed from the line 4—4 of FIG. 3.
Figure 5:
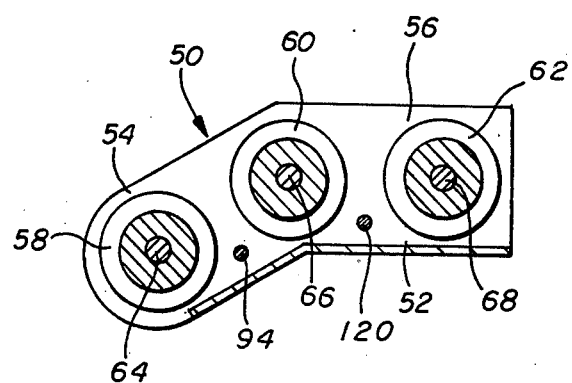
FIG. 5 is a view in longitudinal central section of the pulley assembly shown in FIG. 3.

The first auxiliary component is an angle turning pulley bracket 50 shown in FIGS. 3-5. Angle turning pulley bracket 50 comprises a channel shaped member 52 having separate legs 54 and 56 which are joined at an obtuse angle, viz. 150°. Three pulleys 58, 60 and 62 (3.5 in. dia.) are supported in channel 52 on axles or pivot pins 64, 66 and 68 (4.5 in. spacing), respectively.

At the left end of bracket member 50, as viewed in FIGS. 3 and 4, there is a bifurcated yoke 70 consisting of a short section of square tubing 72 (a female connector) which is closed by an end plate 74 welded thereon. A pair of sheet metal plates 76 and 78 are welded to plate member 74 as indicated at 80 and to square tubing 72 as indicated at 82. The plate members 76 and 78 form the pivot arms of the yoke 70. The pivot arms 78 and 80 of yoke 70 are provided with aligned holes 84 through the pivot rod or pivot pin 64 extends. The pivot arms 76 and 80 have an arcuate portion 86 with a plurality of holes 88 therein which are equidistant from the pivot hole 84.

The holes 88 in pivot arms 76 and 78 are positioned over a pair of bosses 90 on opposite sides of the channel shaped frame 52. Bosses 90 have holes 92 therein with which the holes 88 can be aligned and are of the same size as holes 88. When the holes 88 and 90 are aligned in any selected position, a bolt 94 is positioned therethrough to secure the yoke 50 in place. The square tubing portion 72 of yoke 70 is a female fitting which receives the end of square tubing extension 46 (or any other male connector component) in a male-female relationship. A set screw 94 is provided in square tubing extension 72 to secure the male fitting 72 on the end of square extension 46. A set screw is similarly provided for any other cooperating component or connector forming the female connector in a male-female assembly relationship in the apparatus.

On the right end of the angular pulley bracket 50, is viewed in FIGS. 3 and 4 there is provided a yoke 96 which is of substantially the same construction as yoke 70 except that the fitting for connection to other components of the apparatus is a male fitting. Yoke 96 consists of a small square tubing which is substantially the same size as tubular extension 46 so that it may fit other components in a male-female relationship.

Male fitting 97 has a plate member 98 welded thereon. The side plates 100 and 102 which a form a bifurcated yoke are welded to plate 98 as indicated at 104 and are welded to male fitting 97 as indicated at 106. Male fitting 97 is shown in a male-female connecting relationship with a piece of square tubing 108, which is shown in section. The square tubing 108 will usually be the terminator bracket 166, described below, but may be a connecting fitting or may be the female connector portion of another component of the apparatus. Square fitting 108, which is a female connection, has the same interior dimensions as supporting frame 12 and female fitting 72 on yoke 70. As previously noted, the apparatus is constructed so that all of the separate components fit together in a male-female relationship. The male fittings and the tubular extension 46 all have the same exterior dimensions. The female fittings and the supporting frame 12 all have the same interior dimensions which are sized to received the male fittings or the extension 46 in a telescoping, male-female relationship.

The parallel plates 100 and 102 of yoke 96 have pivot holes 110 which fit over pivot rod or pivot pin 68. The side plates or arms 100 and 102 each have a curved or arcuate portion 112 in which are located a plurality of holes 114 which are spaced equidistantly from pivot hole 110. The channel shaped member 52 has bosses 116 on opposite sides thereof with holes 118 which align with holes 114 in plate members 100 and 102 of yoke 96. When the holes 118 are aligned with any selected one of the holes 114, a bolt 120 is positioned therethrough to secure yoke 96 in any desired position.

In use, the angle pulley bracket 50 may be attached on one end to tubular extension 46, or to any other male fitting, with set screw 94 being tightened to hold the structure together. On the other end, angle bracket 50 is connectable to any female connector, e.g. connector 108. The angle between pulleys or rollers 58, 60, and 62 is 150°; or 30° as measured from an extension from the line through pivot pins 66 and 68. In use, this angle turning pulley bracket is always positioned so that a cable being pulled will never be pulled around a turn of more than about 30°-35° at any point. Thus, if the end yokes are set at angles of 30° relative to the bracket body portions 54 and 56, a cable may be pulled around a 90° turn with no separate portion of the turn being more than 30°.

Figure 7:
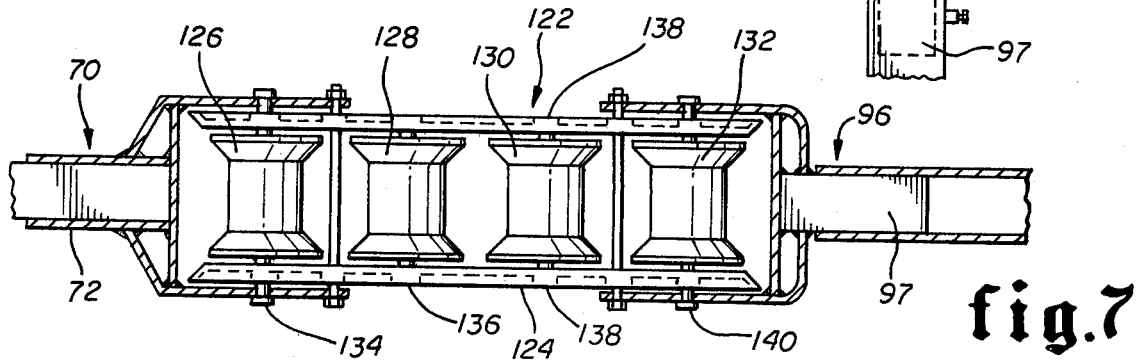
FIG. 7 is a top plan view of the pulley apparatus as viewed from the line 7—7 of FIG. 6.

In FIGS. 6-8, there is shown another form of angle pulley bracket 122 which is similar to angle pulley bracket 50 but which has four rollers or pulleys instead of three. Pulley bracket 122 consists of a channel shaped frame 124 which corresponds the channel shaped frame 52 of bracket 50. The difference in construction is that bracket 122 has its end portions at angles of 35° in relation to the central portion and is provided with four pulleys 126, 128, 130 and 132 which are mounted on axles or pivot pins 134, 136, 138 and 140. The yoke members 70 and 96 have the same construction as the corresponding members angle bracket 50 as shown in FIGS. 3, 4, and 5. These members and the associated parts are given the same reference numerals.

In this bracket 122, yoke member 70 has a female fitting 72 while yoke member 96 has a male fitting 97 as previously described. The several pulleys in pulley bracket 122 have their axes arranged so that there is a change in direction of 35° from each pulley to the next. The arrangement of three pulleys in angle bracket 50 and four pulleys in angle bracket 122 permits the pulling of a wire or cable around a substantially sharp turn, up to 140°, if necessary, without damaging the wire or cable. By using two of the angle turning brackets 50 or 122 together, or by using a bracket having a larger number of pulleys, it is possible to pull a cable around an even greater angular turn, e.g. up to 180°. In this apparatus, the important, and even critical, factor is that the angle turning bracket has a number of pulleys which are spaced on the circumference of a large circle so that the entrance and exit angles and the angle of turn from pulley to pulley by a cable being pulled around the bracket is no more than 30°-35° at any separate turning point.

In FIGS. 9-12, there are shown a number of auxiliary fittings or connectors for operating the cable pulling apparatus in a variety of locations in relation to the conduit through which the cable is being pulled. In FIG. 9, there is shown a bracket 142 for supporting various components of the apparatus in offset, but parallel relation. Bracket 142 consists of a pair of channel backing members 144 and 146 which are welded to square tubular members 148 and 150 spaced apart in parallel relation. The square tubular members 148 and 150 are female connectors of a size to receive either the square tubular extension 46 or the male connector of components such as angle pulley brackets 50 and 122. The square female connector brackets 148 and 150 are each provided with set screws 152, which may be Allen screws or the like.

FIG. 10 illustrates another offset connector bracket 154 in which the square tubular connectors, i.e. female connectors, 156 and 158 are welded to opposite sides of a pair of supporting channels 160 and 162 in parallel but offset or skewed relation. The square tubular female connectors 156 and 158 are each provided with set screws 164 for securing a male connector or tubular extension in place therein.

In FIG. 11, there is shown a terminator bracket 166 which consists of a short section of square tubing 168 having angularly extending plates 170 and 172 welded thereon. The plates 170 and 172 define a dihedral angle support for steadying the apparatus when resting against a pipe or conduit or other tubular surface. Terminator bracket member 168 is a female connector and is provided with a set screw 174 for tightening to secure a male fitting or a square tubular extension to place therein. Terminator bracket member 166 is normally positioned on the male connector 97 of yoke 96 of angle turning brackets 50 and 122. Terminator bracket member 166 is used to steady or secure the end of the angle turning bracket 50 or 122 in place at the point where the cable is being pulled from the building conduit.

In FIG. 12 there is shown another end bracket 176 which consists of a pair of square tubular sections 178 and 180 (actually a single piece with a central notch). Square tubular sections 178 and 180 are welded to a short section of channel 182 in aligned relation. The square tubular sections 178 is a female connector of a size fitting any of the male connectors on the components of this apparatus or the square tubular extension 46 or any other square tubular members which may be used in the apparatus. The square tubular bracket 178 is provided with set screws 184 for securing the male members or the square tubular extension in place therein.

Square tubular bracket member 180 is provided with a member 186 of channel shaped cross-section with the side portions 188 thereof cut in a V to provide a pair of dihedral surfaces for mounting to pipe or conduit. This channel shaped member has flanges 190 and 192 on opposite sides thereof. The flange 192 has a slot (not shown) therein which receives links of a chain 194 at selected positions to adjust the chain for length. The other end of chain 194 is connected to threaded connector 196 which is operated by handle 198. This chain connector provides a quick disconnect for attaching the bracket to pipe or other small cylindrical surfaces.

OPERATION

The cable pulling apparatus 10 described above is shown in a variety of modes of operation in FIGS. 13-21 of the drawings. The basic cable pulling apparatus 10, as shown in FIGS. 1 and 2, and described above, consists simply of a mobile unit having motor 38 to drive pulleys or capstans 42 and 44 to pull a rope or cord 200 attached to a cable 202. The auxiliary components of the apparatus, described above, permit the apparatus to be used in different, and sometimes awkward, locations for pulling cable through electrical conduits. The extension tube 46 may be extended to substantially full length to locate the angular pulley brackets 50 and/or 122 at a particular distant location.

The simplest application of the apparatus is to pull a cable through a conduit which opens horizontally through a wall at a location on exactly the same level as the cable pulling apparatus 10 when located in a horizontal position. In such a case, the end of frame 12 would be positioned against the wall through which the conduit extends and the extension tube 46 would not be required. In this case the apparatus would be pulling the cable by a direct, straight-line pull out of the conduit. The apparatus can also be operated without the auxiliary components whenever the equipment can be aligned with the open end of a conduit for a direct, straight-line pull.

It should be noted, however, that most conduits are not so conveniently located. For conduits at any location other than on the level or in any other position where a straight-line pull can be used, it is necessary to use the various angle turning pulley brackets 52 or 122 and also various connector brackets 142, 154, 166 or 176 to locate the application of cable pulling force in line with the open end of the conduit through which the cable is being pulled. It should be noted that the brackets 50 and 122 can be used interchangeably in most applications, although generally the use of bracket 122 is used for turns of up to 140° while bracket 50 is limited to turns of 90° or less. The several views in FIGS. 13-21 illustrate applications of the apparatus in different locations, making use of the various angle turning pulley brackets or other supporting brackets or connectors.

In FIG. 13, there is shown a junction box 204, or the like, having conduit 206 opening vertically upward into it through which the cable 202 is drawn. In this application, the cable pulling apparatus 10 has square tubular extension 46 extended to the desired location and has the angle turning pulley bracket 122 secured on the end of the tubular extension and positioned with terminator 166 against the bottom of the junction box 204 to effect a direct pull on the cable 202. In this application, the bracket 122 is secured on square tubular extension 46 by female connector 72 and the pulleys 126, 128, 130 and 132 are positioned to cause the cable 202 to be pulled gently around a turn of 140° with every change of direction being only 35° of turn. This arrangement makes it possible for motor 38 to drive capstans 42 and 44 to pull rope or cord 200 and cable 202 around a relatively sharp turn, e.g. 140°, without creasing or bending the cable which otherwise might cause substantial damage to the cable.

FIG. 14 shows the use of the apparatus 10 in pulling cable 202 vertically downward through conduit 206 into junction box 206, or the like. In this application of the apparatus 10, tubular extension 46 is butted against the back and bottom walls of the junction box 204 for steady support. The frame 12 and extension 46 are positioned at an angle of 30° from the wall in which the junction box 204 is located. Angle turning pulley bracket 50 is supported with terminator 166 against the top of the junction box 204 in position to pull the cable 202 downward by a straight-line pull and around the 30° turn around the middle pulley of the bracket. Bracket 50 is supported by offset bracket 142 on tubular extension 46. Offset bracket 142 has female connector portion 150 fitted over and secured on tubular extension 46 by its set screw. A short piece 208 of square tubing, functioning as a male connector, fits in female bracket portions 148 (of bracket 142) and 72 (of bracket member 50).

FIG. 15 shows an application of the apparatus similar to that of FIG. 14 in which the end portion of the apparatus is secured to the downwardly extending end 212 of conduit 206. Angle turning bracket 50 is supported on offset bracket 142 as in FIG. 14. The male end 97 of bracket yoke 96 is supported in the female connector 178 of bracket 176. The other connector 180 of bracket 176 is positioned with the V portions 188 of the side walls of channel 186 abutting the conduit end 212 and secured thereto by chain 194.

In FIG. 16, the apparatus is positioned to provide a straight-line horizontal pull over an intermediate obstacle. In this application of the apparatus, there is a wall 214 or high window or other obstacle over or through which the apparatus must work. The apparatus 10 is shown with the tubular extension 46 extended to support angle turning bracket 122 over the wall or obstacle 214. The male end 97 of bracket 122 fits in one end of a section 218 of square tubing of a size providing a female connector and having set screws to secure the assembly together. The other end of female connector 218 fits over a square tubular member 216 of the size of the male connectors and tubular extension 46. Angle turning bracket 50 is supported on offset bracket 142 supported on tubular member 216. The assembly, as shown, supports bracket 50 with pulley 62 positioned in-line with the end of conduit 206. The apparatus is thus assembled in a manner which effects a direct pull on cable 202 while pulling it in a series of gentle turns around 90° in one direction and more than 90° in another direction.

In FIG. 17 the apparatus has the angle turning brackets 122 and 50 positioned to pull cable from a subterranean location as in a basement or down inside a man hole. In this application of the apparatus, there is a man hole 220 into which one or more electrical conduits 222 open into which the apparatus must work. The apparatus 10 is shown with the tubular extension 46 extended to support angle turning bracket 122 over the opening to man hole 220.

The male end 97 of bracket 122 fits in one end of a section 218 of square tubing of a size providing a female connector and having set screws to secure the assembly together. The other end of female connector 218 fits over a square tubular member 216 of the size of the male connectors and tubular extension 46. Tubular member 216 rests on the bottom of the work area in the man hole 220 to support the angle turning brackets to provide a direct straight-line pull of the cable 202.

Angle turning bracket 50 is supported on offset bracket 142 supported on tubular member 216. The assembly, as shown, supports bracket 50 with pulley 62 positioned inline with the end of conduit 222. The apparatus is thus assembled in a manner which effects a direct pull on cable 202 while pulling it in a series of gentle turns around 90° in one direction and then 90° in another direction. In making the 90° turn around bracket member 50, the individual turns are no more than 30° each. In making the 90° turn around bracket member 122, the 90° is broken into four separate segments, no one of which exceeds 35°.

In FIG. 17, the angle brackets change the direction of pull in two different directions but lying in substantially the same plane. In FIGS. 18 and 19, the arrangement is substantially the same but one of the angle turning brackets is turned 90° out of the plane of the other bracket. The apparatus is therefore pulling in one direction around a 90° turn then in another 90° turn out of the plane of the first turn. Offset bracket 154 is used in this application of the apparatus to permit the change in direction of the two turns. Since the components are otherwise the same, the same reference numerals are used as in FIG. 17 and no further description is believed to be necessary.

FIGS. 20 and 21 show the use of the apparatus in pulling cable from one of several conduits opening into a junction box or the like. In this view, the bracket 166 is secured on the male end 97 of angle turning bracket 122 with dihedral plates 170 and 172 fitting against the end of conduit 206 through which the cable 202 is being pulled.

While this invention has been described fully and completely with special emphasis on a number of components making up the preferred embodiment of the invention, it should be understood that, within the scope of the appended claims, the invention may be practiced otherwise than as specifically described herein.

I claim:

1. A portable powered apparatus for pulling electric cable through conduits in buildings comprising, as an assembly for use in combination,
   a supporting frame comprising a first elongated hollow tubular member,
   at least one capstan positioned on said frame,
   motor means supported on said frame and operatively connected to said capstan for driving the same,
   a second hollow tubular member having an exterior size and shape fitting the interior of said first tubular member and positioned for telescopic movement therein,
   at least one angle turning pulley bracket for directing a pull line around a substantial angular turn,
   said bracket comprising a bracket frame,
   at least three pulleys supported in said bracket frame non-linearly to permit a line being pulled to make a substantial turn in at least three separate small angular turns not in excess of about 30°–35° each,
   a first yoke pivotally supported on one end of said bracket frame and including a female tubular connector having an interior size and shape operable to fit removably over the end of said second tubular member,
   a second yoke pivotally supported on the other end of said bracket frame and including a male tubular connector of the same exterior size and shape as said second tubular member, and
   means to secure said first and said second yokes in selected angular relation to said bracket frame,
   whereby a line may be pulled by powered operation of said capstan around a substantial angle as directed by the pulleys of said angle turning bracket.

2. A cable pulling apparatus according to claim 1 in which
   said bracket frame comprises a channel member,
   at least three pulleys supported in said channel member in a non-linear relation to permit a line being pulled to make a substantial turn in at least three separate small angular turns,
   a first yoke pivotally supported on one end of said channel member and including a female tubular connector having an interior size and shape operable to fit removably over the end of said second tubular member, a second yoke pivotally supported on the other end of said channel member and including a male tubular connector of the same exterior size and shape as said second tubular member, said means to secure said first and said second yokes in selected angular relation to said bracket frame comprises a pair of holes in said channel member a selected distance from the respective pivots of said yokes, a plurality of holes in each of said yokes located for alignment with said first named holes in a selected angular position of said yokes, and securing members insertable into the aligned holes on said yokes and said channel to secure said yokes in a selected position.

3. A cable pulling apparatus according to claim 1 in which the axes of said pulleys are equidistant from a common exterior point.

4. A cable pulling apparatus according to claim 1 including axle brackets on said first tubular member, wheels on said axle brackets for moving said apparatus, and handles on said first tubular member for moving the same.

5. A cable pulling apparatus according to claim 1 in which said first and said second hollow tubular members are square tubing.

6. A cable pulling apparatus according to claim 3 in which said angle turning bracket has four pulleys supported in aligned non-linear relation in said bracket frame and operable to turn a line being pulled in four separate small angular turns.

7. A cable pulling apparatus according to claim 1 including at least one supporting bracket having a connector of a size and shape for connection to one of said bracket yoke connectors for supporting said angle turning bracket in a selected position.

8. A cable pulling apparatus according to claim 7 in which said supporting bracket comprises a pair of connectors positioned in linear alignment.

9. A cable pulling apparatus according to claim 7 in which one of said connectors includes means for securing the same to an external support.

10. A cable pulling apparatus according to claim 7 in which said supporting bracket comprises a pair of connectors in laterally offset parallel relation.

11. A cable pulling apparatus according to claim 7 in which said supporting bracket comprises a pair of connectors in diagonally offset parallel relation.

12. A cable pulling apparatus according to claim 7 in which said supporting bracket has a single connector and a pair of dihedral plates thereon for steadying the same against a cylindrical surface.

13. A cable pulling apparatus according to claim 7 including at least one tubular support for attachment to one supporting bracket for supporting one of said angle turning brackets in a selected position.

14. A cable pulling apparatus according to claim 7 including at least one short section of a tubular member sized for interconnecting two male connectors.

15. A cable pulling apparatus according to claim 7 including at least one short section of a tubular member sized for interconnecting two female connectors.

16. A cable pulling apparatus according to claim 3 including at least one supporting bracket having a female connector of a size and shape for connection to one of said bracket yoke connectors for supporting said angle turning bracket in a selected position.

17. A cable pulling apparatus according to claim 16 in which said supporting bracket comprises a pair of female connectors positioned in linear alignment.

18. A cable pulling apparatus according to claim 17 in which one of said connectors includes means for securing the same to an external support.

19. A cable pulling apparatus according to claim 16 in which said supporting bracket comprises a pair of female connectors in offset parallel relation.

20. A cable pulling apparatus according to claim 7 including at least one square tubular member for attachment to one of said connectors in male-female relation to support one of the members of said apparatus in a selected position.

* * * * *